United States Patent
Lee et al.

(10) Patent No.: US 9,607,651 B2
(45) Date of Patent: Mar. 28, 2017

(54) METHOD AND APPARATUS FOR CONTROLLING CONTENTS IN ELECTRONIC DEVICE

(71) Applicant: Samsung Electronics Co., Ltd., Gyeonggi-do (KR)

(72) Inventors: Woo-Yong Lee, Gyeonggi-do (KR); Yun-Son Yoo, Gyeonggi-do (KR); Sang-Heum Cho, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/144,868

(22) Filed: Dec. 31, 2013

(65) Prior Publication Data

US 2014/0193132 A1  Jul. 10, 2014

(30) Foreign Application Priority Data

Jan. 7, 2013 (KR) .................. 10-2013-0001743

(51) Int. Cl.
| | |
|---|---|
| *H04N 9/80* | (2006.01) |
| *G11B 27/00* | (2006.01) |
| *G11B 27/10* | (2006.01) |
| *H04N 21/422* | (2011.01) |
| *H04N 21/4223* | (2011.01) |
| *H04N 21/442* | (2011.01) |

(Continued)

(52) U.S. Cl.
CPC .......... *G11B 27/005* (2013.01); *G11B 27/105* (2013.01); *H04N 21/4223* (2013.01); *H04N 21/42203* (2013.01); *H04N 21/42222* (2013.01); *H04N 21/42224* (2013.01); *H04N 21/44218* (2013.01); *H04N 21/47217* (2013.01); *G06F 3/167* (2013.01)

(58) Field of Classification Search
CPC ...................................... G11B 27/005
USPC ......................... 386/225, 241, 344
See application file for complete search history.

(56) References Cited

U.S. PATENT DOCUMENTS

| | | |
|---|---|---|
| 6,525,749 B1 | 2/2003 | Moran et al. |
| 8,271,287 B1 | 9/2012 | Kermani |
| 2004/0183824 A1 | 9/2004 | Benson et al. |

(Continued)

FOREIGN PATENT DOCUMENTS

| | | |
|---|---|---|
| EP | 0 667 567 A2 | 8/1995 |
| EP | 2 463 860 A1 | 6/2012 |

(Continued)

OTHER PUBLICATIONS

Asaad Hakeem et al, An Object-based Video Coding Framework for Video Sequences Obtained From Static Cameras, ACM, 2 Penn Plaza, Suite 701—New York, U.S., Nov. 11, 2005, XP040030954, pp. 608-617.

(Continued)

*Primary Examiner* — Hung Dang
*Assistant Examiner* — Girumsew Wendmagegn
(74) *Attorney, Agent, or Firm* — Cha & Reiter, LLC

(57) ABSTRACT

Provided is a method and apparatus for playing contents in an electronic device. The method of playing contents may include displaying a reference image of a content, when sensing a user's input, determining a playback scheme matched with the user's input, and playing the content on the basis of the playback scheme matched with the user's input.

22 Claims, 19 Drawing Sheets

(51) Int. Cl.
*H04N 21/472* (2011.01)
*G06F 3/16* (2006.01)

(56) References Cited

U.S. PATENT DOCUMENTS

| | | |
|---|---|---|
| 2006/0114327 A1* | 6/2006 | Araya et al. ............. 348/207.99 |
| 2007/0113200 A1 | 5/2007 | Schipper |
| 2009/0208062 A1* | 8/2009 | Sorek .................... H04N 5/232 |
| | | 382/107 |
| 2010/0110228 A1 | 5/2010 | Ozawa et al. |
| 2010/0182264 A1 | 7/2010 | Hahn et al. |
| 2010/0304731 A1 | 12/2010 | Bratton et al. |
| 2011/0032191 A1 | 2/2011 | Cooke et al. |
| 2011/0231763 A1* | 9/2011 | Sakaguchi ............. H04N 5/915 |
| | | 715/720 |
| 2012/0141088 A1 | 6/2012 | Isozu et al. |
| 2012/0166950 A1 | 6/2012 | Frumar et al. |
| 2012/0200574 A1* | 8/2012 | Hill et al. .................... 345/473 |
| 2012/0230606 A1* | 9/2012 | Sugiyama et al. ............ 382/284 |
| 2013/0002709 A1* | 1/2013 | Yamagata ............. H04N 5/772 |
| | | 345/619 |
| 2013/0110268 A1 | 5/2013 | Matsuura et al. |

FOREIGN PATENT DOCUMENTS

| | | | |
|---|---|---|---|
| JP | WO 2011111708 A1 * | 9/2011 | ............. H04N 5/772 |
| JP | 2012-14604 A | 1/2012 | |
| KR | 10-2005-0035417 A | 4/2005 | |
| KR | 10-2010-0120982 A | 11/2010 | |
| KR | 10-2011-0056953 A | 5/2011 | |
| RU | 2303811 C1 | 7/2007 | |
| RU | 2386164 C2 | 4/2010 | |
| RU | 2436160 C2 | 12/2011 | |
| WO | 2012004921 A1 | 1/2012 | |

OTHER PUBLICATIONS

Russian Search Report, dated Nov. 9, 2016.

* cited by examiner

METHOD AND APPARATUS FOR CONTROLLING CONTENTS IN ELECTRONIC DEVICE

CLAIM OF PRIORITY

This application claims priority under 35 U.S.C. §119 to an application filed in the Korean Intellectual Property Office on Jan. 7, 2013 and assigned Serial No. 10-2013-0001743, the entire contents of which are incorporated herein by reference.

BACKGROUND

1. Technical Field

The present disclosure relates generally to a method and apparatus for controlling contents in an electronic device and, more particularly, to a method and apparatus for playing contents on the basis of a user input scheme in an electronic device.

2. Description of the Related Art

As information communication technologies and semiconductor technologies continue to develop, mobile electronic devices have evolved into multimedia devices that provide various multimedia services using data communication services as well as voice call services. For example, mobile electronic devices may provide various services such as broadcast services, wireless internet services, camera services, and music playback services.

Users of mobile electronic devices are increasingly demanding that their mobile electronic devices provide more functionality and services, such as multimedia services. For example, the mobile electronic devices may provide services using moving picture contents as a way of satisfying various needs of the users. The moving picture contents may represent synthesized picture contents of a plurality of consecutively displayed pictures or frames that are displayed in order at a predetermined interval.

When a mobile electronic device provides the service of playing moving picture contents, other functions of the mobile electronic device may be inaccessible to the user.

SUMMARY

An aspect of the present disclosure is to substantially solve at least the above problems and/or disadvantages and to provide at least the advantages below. Accordingly, an object of the present invention is to provide a method and apparatus for generating a moving picture content in an electronic device.

Another aspect of the present disclosure is to provide a method and apparatus for automatically setting a motion region for estimating motions of a subject in consecutively imaged pictures to generate a moving picture content.

Another aspect of the present disclosure is to provide a method and apparatus for synthesizing motion region information in the consecutively imaged pictures and generating a moving picture content.

Another aspect of the present disclosure may be to provide a method and apparatus for setting a playback scheme according to user's input information when generating a moving picture content in an electronic device.

Another aspect of the present disclosure may be to provide a method and apparatus for playing contents according to a playback scheme matched with user's input information.

Another aspect of the present disclosure may be to provide a method and apparatus for generating a video content according to a playback scheme matched with user's input information.

Another aspect of the present disclosure may be to provide a method and apparatus for playing a moving picture content according to a playback scheme matched with user's input information.

Another aspect of the present disclosure may be to provide a method and apparatus for selectively playing at least one motion region included in a moving picture content in an electronic device.

In accordance with an aspect of the present disclosure, a method of playing a content in an electronic device may include: displaying a reference image of a content; when sensing a user's input, determining a playback scheme matched with the user's input; and playing the content on the basis of the playback scheme matched with the user's input.

In accordance with an aspect of the present disclosure may further include obtaining a plurality of images through consecutive imaging by using a camera, determining reference regions in the plurality of images, and synthesizing images included in the reference regions of the plurality of images to generate the moving picture content.

In accordance with an aspect of the present disclosure, an electronic device may include: a display unit, an input unit; and at least one processor, wherein the processor displays a reference image of a content on the display unit and plays the content on the basis of a playback scheme matched with user's input when the user's input is sensed through the input unit.

In accordance with an aspect of the present disclosure, the processor may obtain a plurality of images imaged through the camera, determines reference regions in the plurality of images, and may synthesize images included in the reference regions of the plurality of images to generate the moving picture content.

BRIEF DESCRIPTION OF THE DRAWINGS

The above and other aspects, features and/or advantages of the present disclosure will become more apparent from the following detailed description when taken in conjunction with the accompanying drawings in which.

DETAILED DESCRIPTION

Preferred embodiments of the present disclosure will be described herein below with reference to the accompanying drawings. In the following description, detailed descriptions of well-known functions or constructions will be omitted so that they will not obscure the disclosure in unnecessary detail. Also, the terms used herein are defined according to the functions of the present disclosure. Thus, the terms may vary depending on user's or operator's intentions or practices. Therefore, the terms used herein must be understood based on the descriptions made herein.

Hereinafter, the present disclosure describes a technology for playing (or executing) a content according to input information in an electronic device.

In description below, the electronic device may include one or more of a mobile communication terminal, a personal digital assistant (PDA), a Personal Computer (PC), a laptop computer, a smart phone, a net book, a television, a mobile internet device (MID), an ultra mobile PC (UMPC), a tablet PC, a navigation device, a smart TV, media player, a digital camera, an MP3 and digital audio player.

Figure 1:
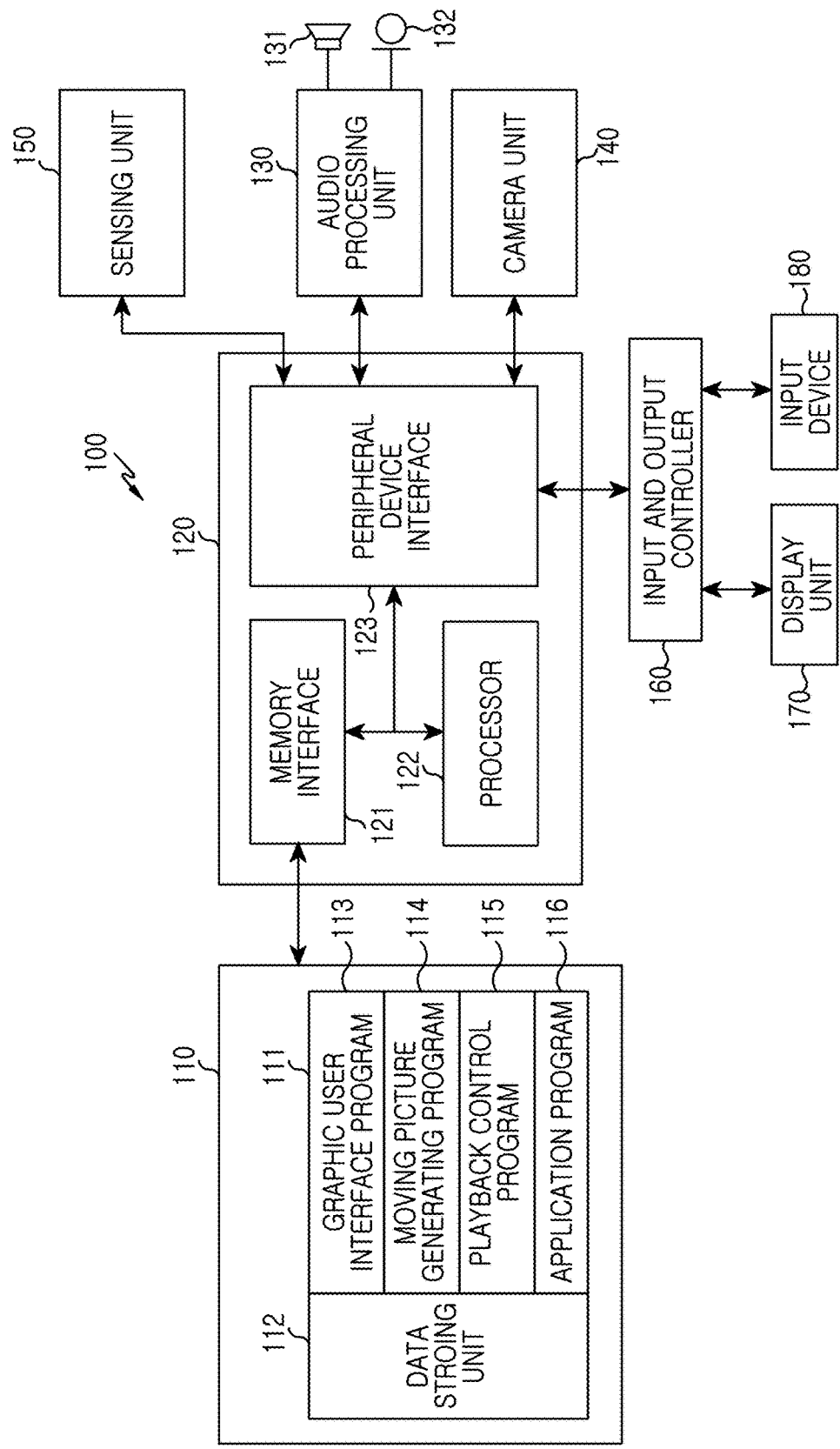
FIG. 1 illustrates a block configuration of an electronic device according to an embodiment of the present disclosure.

FIG. 1 illustrates a block configuration of an electronic device according to an embodiment of the present invention.

Referring to FIG. 1, the electronic device 100 includes a memory 110, a processor unit 120, an audio processing unit 130, a camera unit 140, a sensing unit 150, an input and output control unit 160, a display unit 170, and an input device 180. Here, the memory 110 may be a single element or may include a plurality of elements.

The memory 110 includes a program storing unit 111 storing programs for controlling operations of the electronic device 100 and a data storing unit 112 storing data generated during execution of the programs.

The data storing unit 112 stores video contents, moving picture contents and control information on the contents according to input information. For example, the data storing unit 112 may store the moving picture contents generated through a moving picture generation extracting program 114 and control information on the moving picture contents according to the input information generated through the playback control program 115. For example, the data storing unit 112 may store the video contents and control information on the video contents according to the input information generated through the playback control program 115.

The program storing unit 111 may include a graphic user interface (GUI) program 113, a moving picture generating program 114, the playback control program 115, and at least one application program 116. Here, the programs stored in the programs storing unit 111 are as sets of commands and may be represented as command sets.

The GUI program 113 includes at least one software element for graphically providing a user interface on the display unit 170. For example, the GUI program 113 may control information on the application program driven by the processor 122 to be displayed on the display unit 170.

The moving picture generating program 114 may include at least one software element for generating the moving picture content. For example, the moving picture generating program 114 may generate the moving picture content by synthesizing a plurality of images consecutively imaged through the camera unit 140. For another example, the moving picture generating program 114 may generate a moving picture content by synthesizing information on motion regions set by input information by a user through the input device 180 among the plurality of consecutively imaged images. As another example, the moving picture generating program 114 generates a moving picture content by synthesizing information on the motion regions set by user's input information received from input device 180 among the plurality of consecutive images imaged through the camera unit 140. As another example, the moving picture generating program 114 may compare the plurality of consecutive images imaged through the camera unit 140, extracts regions in which motions are generated, and sets the regions as the motion regions. Then, the moving picture generating program 114 may generate a moving picture content by synthesizing information on the motion regions of the consecutively imaged images. At this time, the moving picture generating program 114 may compare the images by each pixel unit and set the motion regions.

Figure 9A:
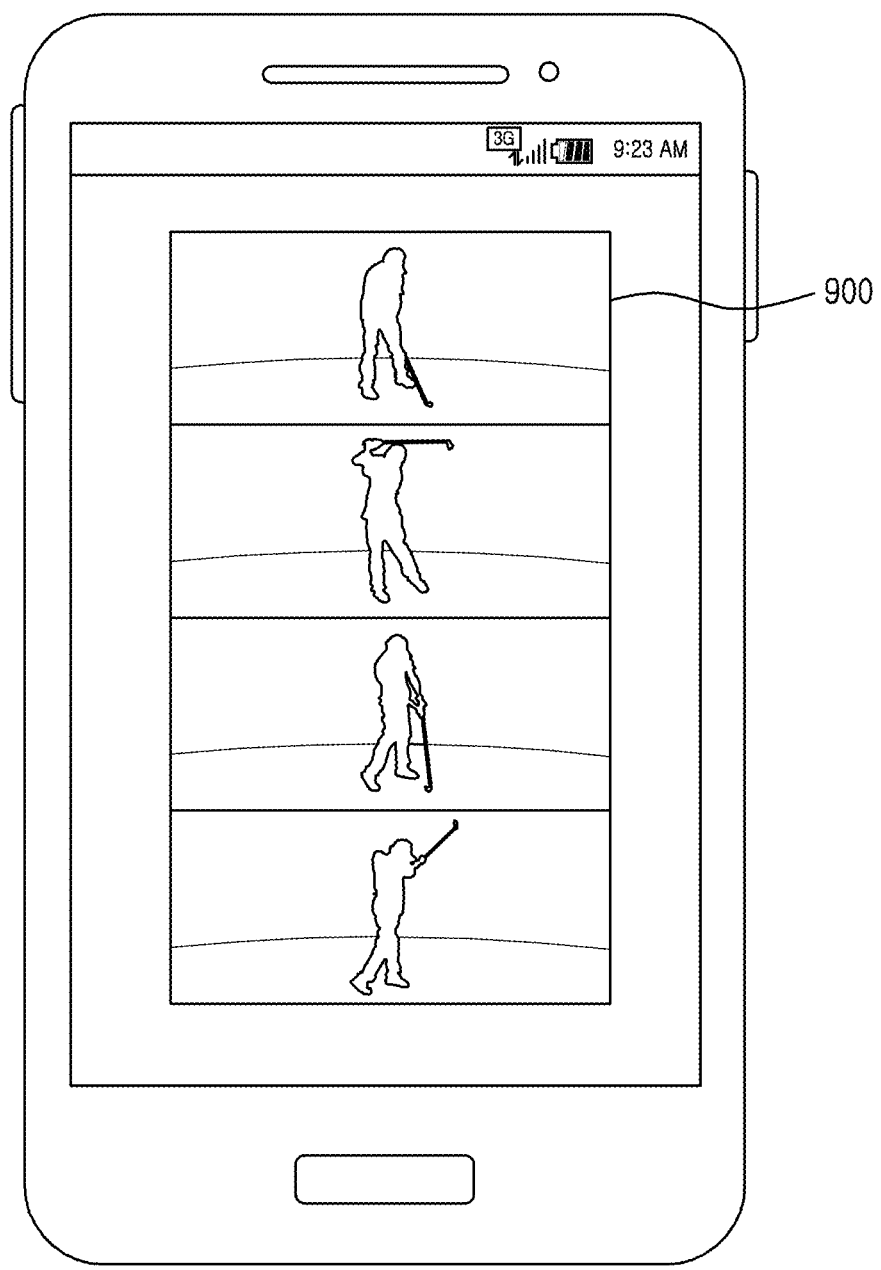
FIG. 9A, FIG. 9B, FIG. 9C, FIG. 9D and FIG. 9E illustrate screen configurations for playing a moving picture content on the basis of input information in an electronic device according to an embodiment of the present invention.
Figure 9B:
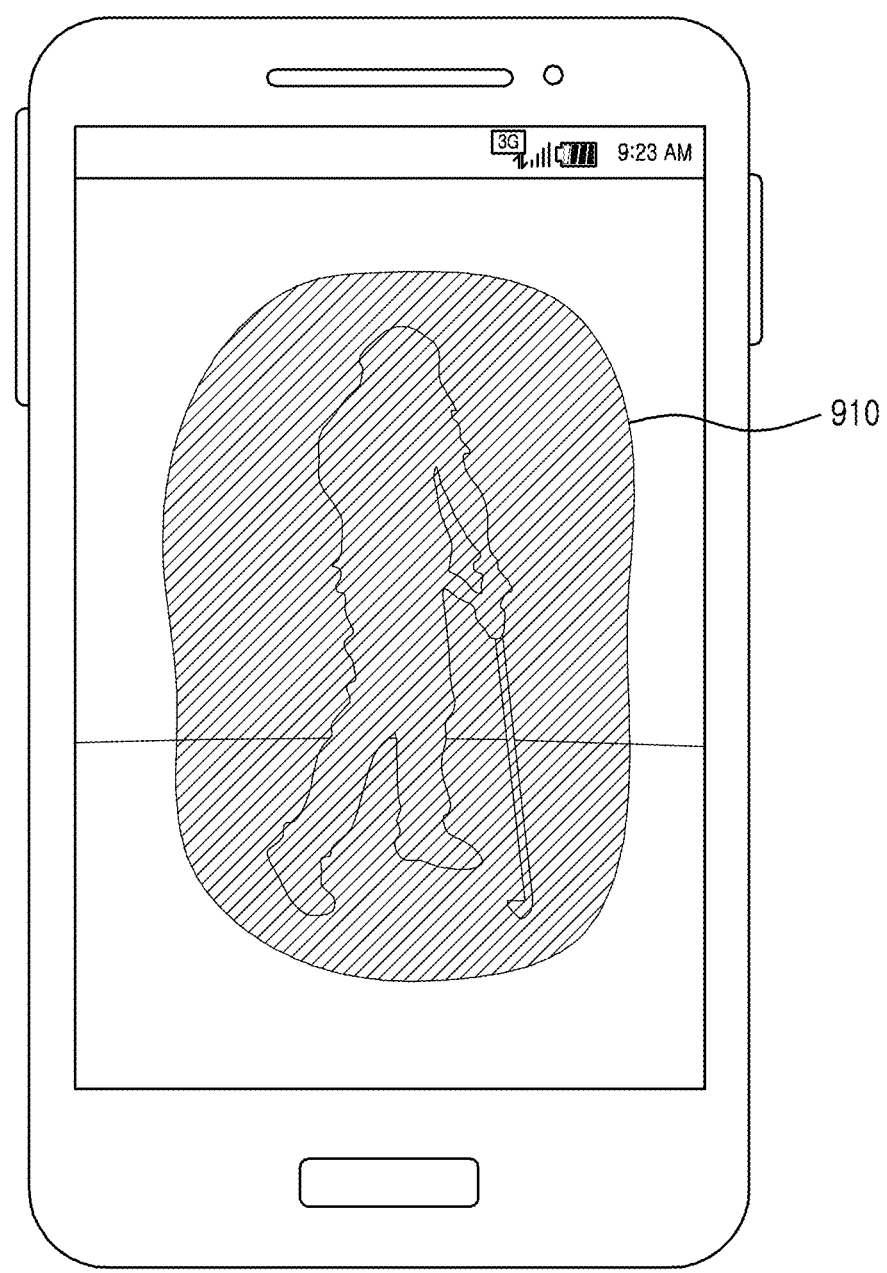
Figure 9C:
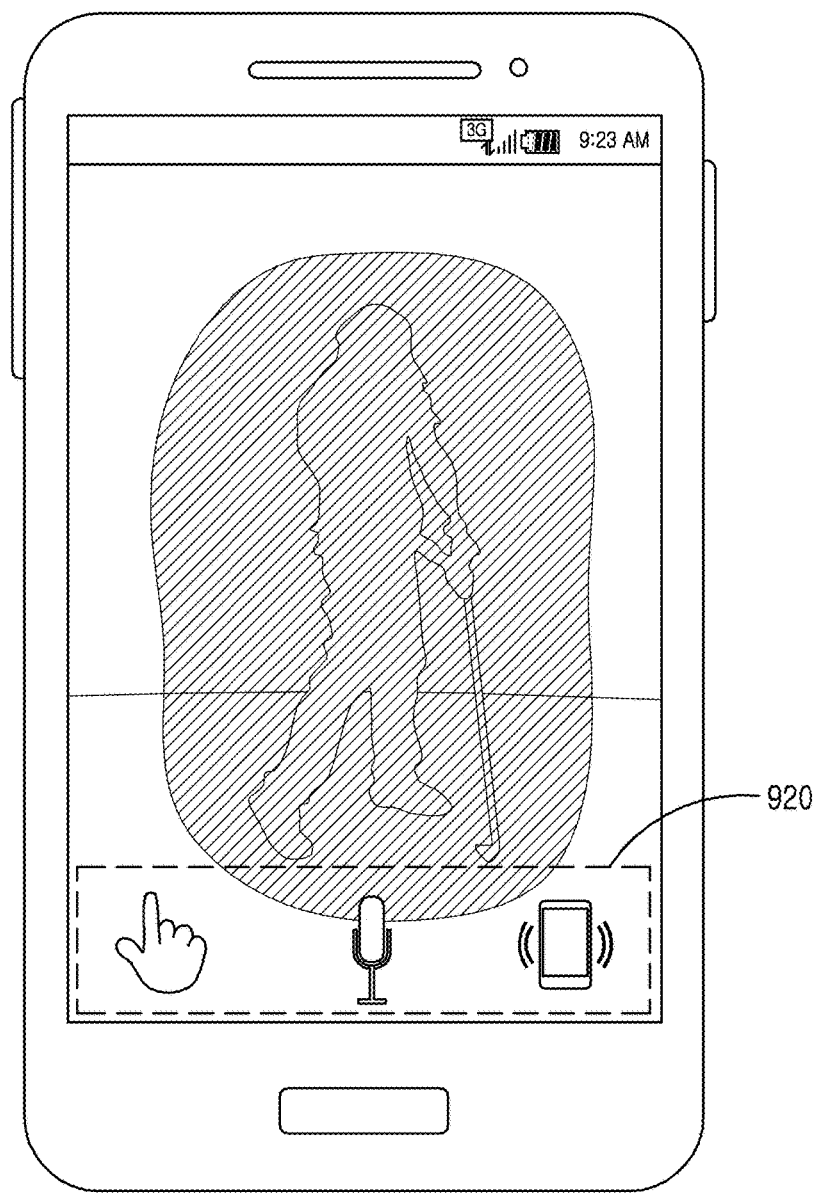

The playback control program 115 may include at least one software element for determining a playback scheme for a video content or a moving picture content according to user's input information received from at least one of a microphone 132, a sensing unit 150, and an input device 180. For example, as shown in FIG. 9E, when sensing a touch input that is dragged between point 941 and point 943 on the input device 180, the playback control program 115 selects a playback scheme of the video content or the moving picture content, which matches with the drag information from among playback schemes stored in the data storing unit 112.

Figure 10A:
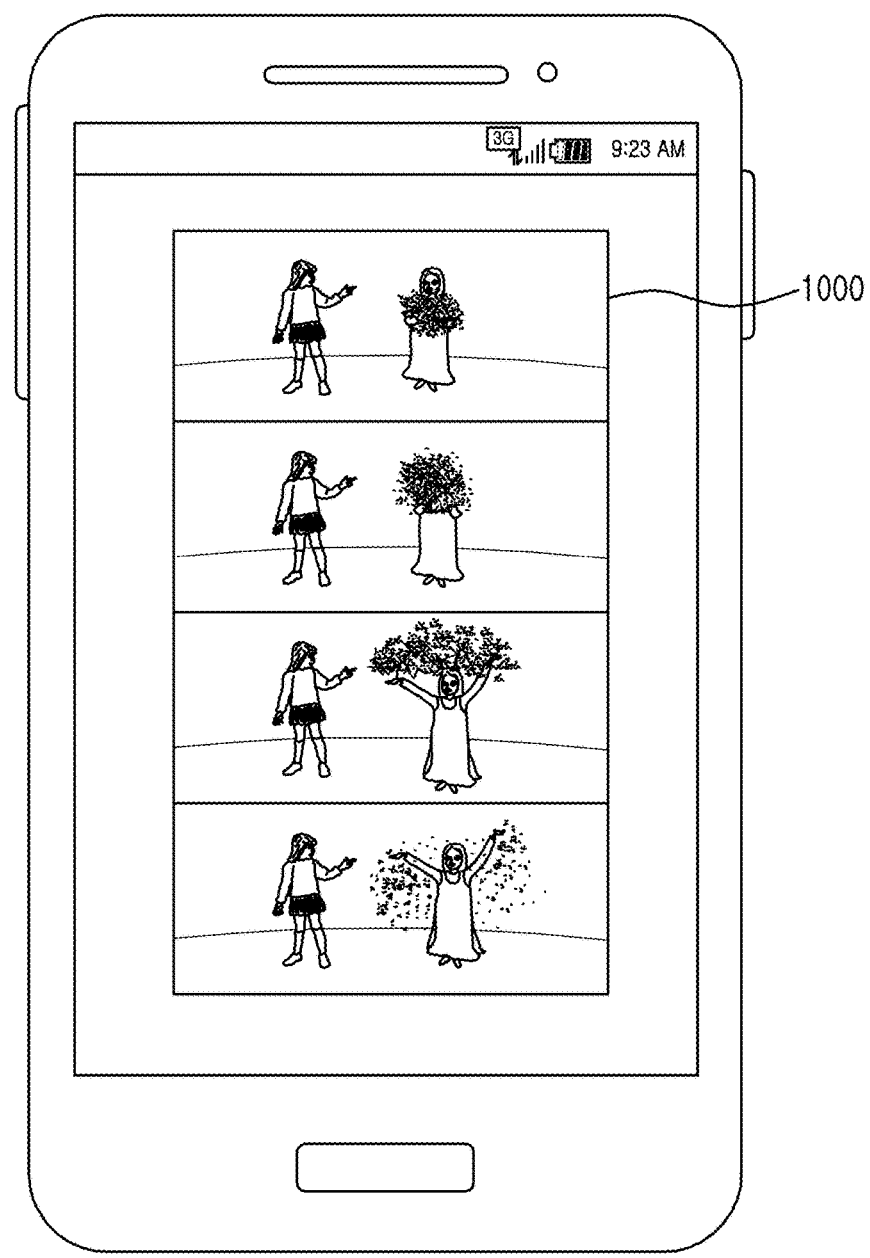
FIG. 10A, FIG. 10B, FIG. 10C, FIG. 10D and FIG. 10E illustrate screen configurations for playing a moving picture content on the basis of input information in an electronic device according to another embodiment of the present invention.
Figure 10B:
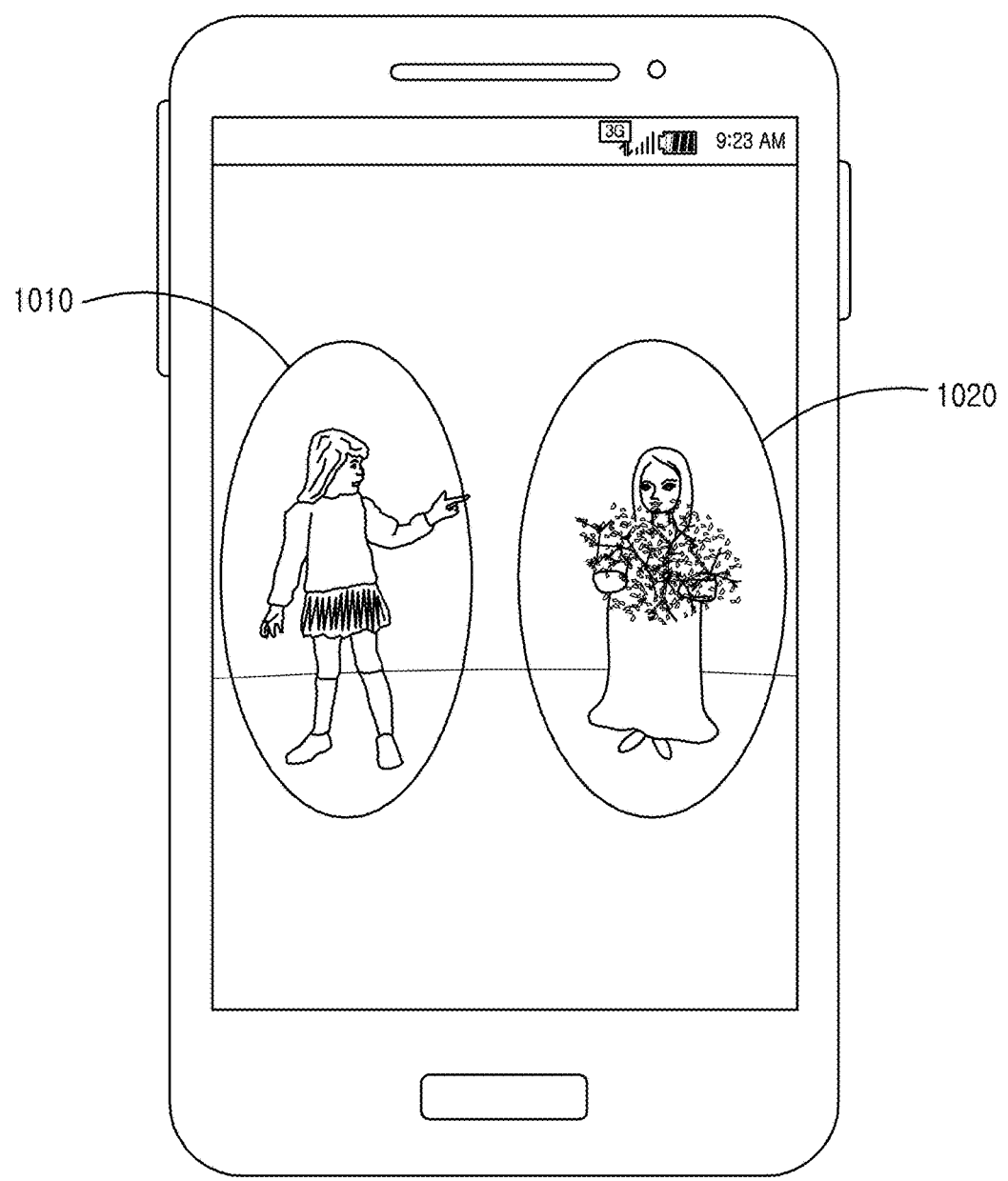
Figure 10C:
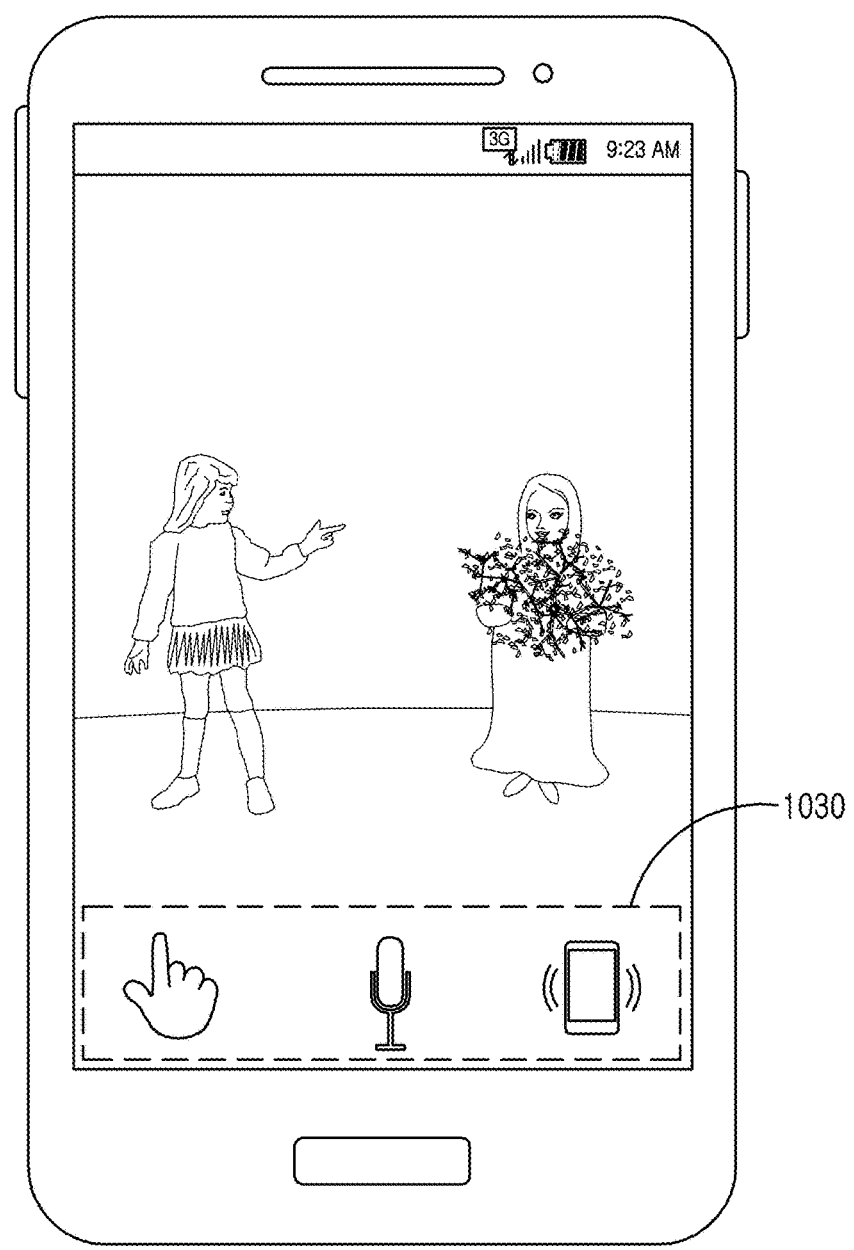
Figure 10D:
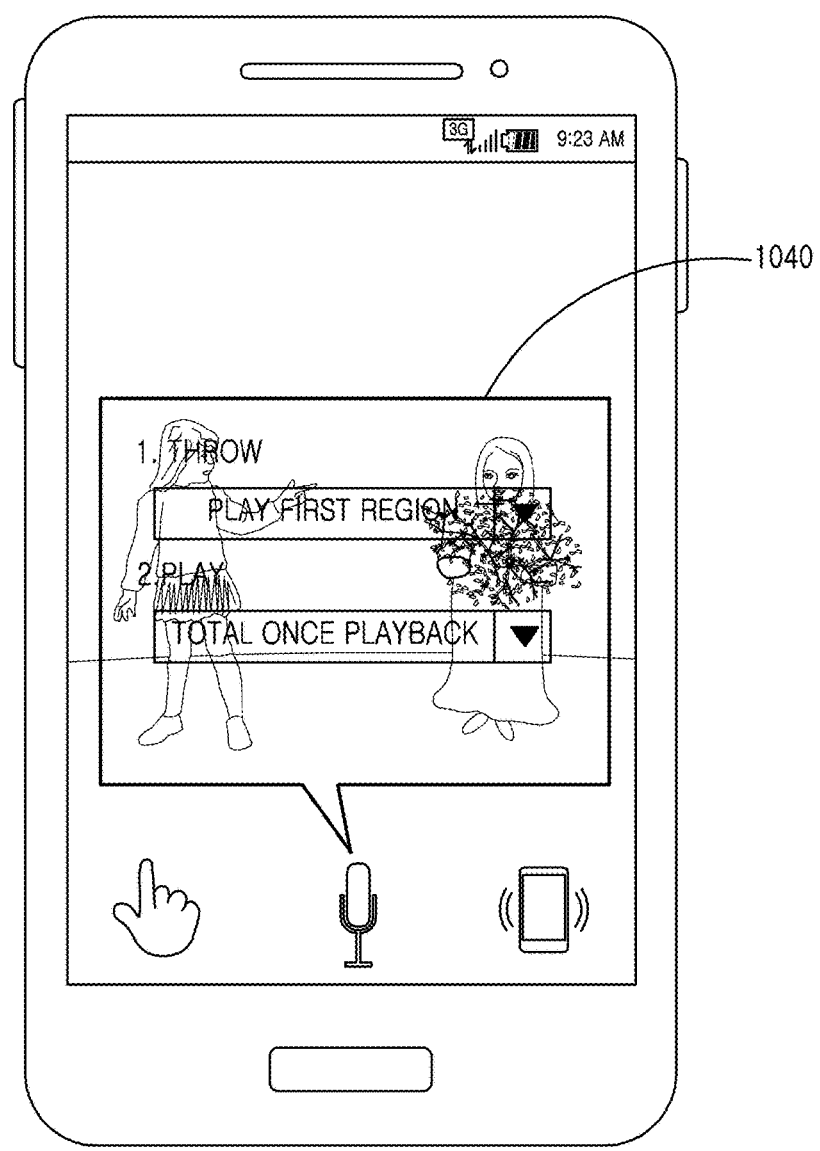
Figure 10E:
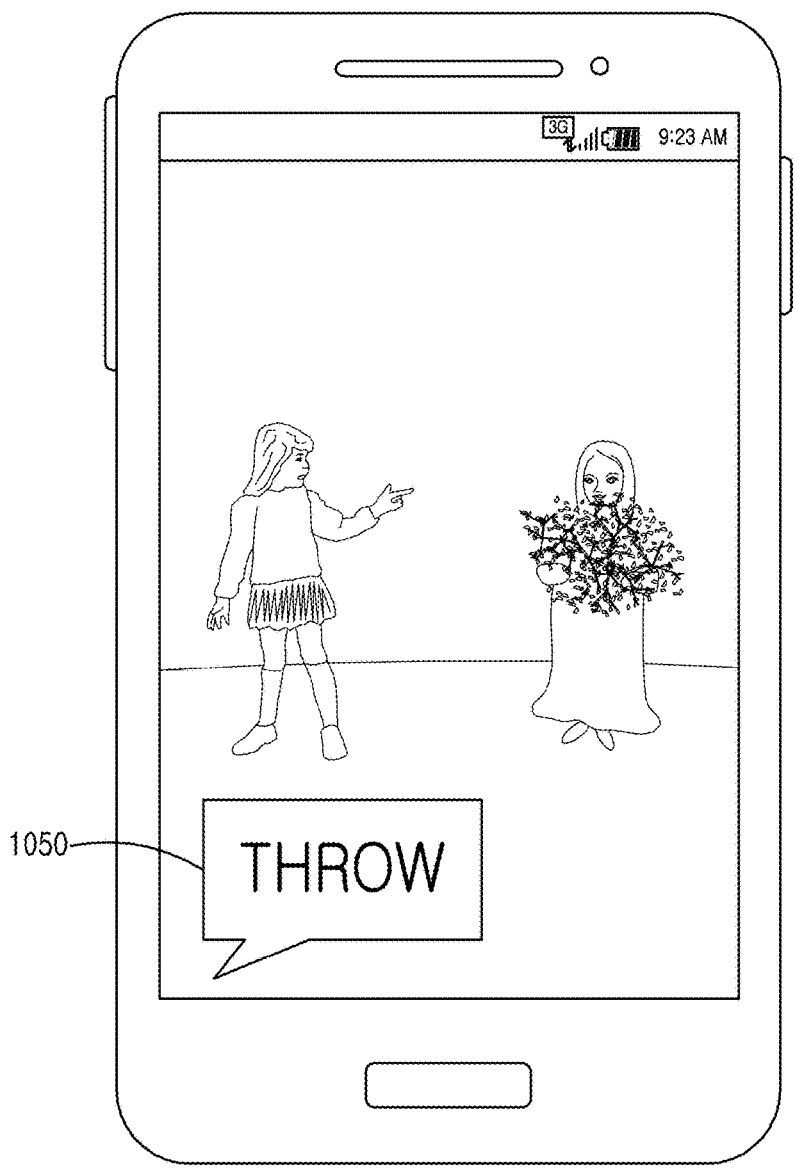

For another example, as shown in FIG. 10E, when receiving a voice command "Throw" 1050, e.g., the user speaks the word "throw," through the microphone 132, the playback control program 115 may select a playback scheme of a video content or a moving picture content, which matches with the voice command "Throw" from among the playback schemes stored in the data storing unit 112. It is to be understood that the word "throw" is merely one example of a voice command, and that the voice command "Throw" 1050 may be any spoken command.

As another example, when sensing shaking of the electronic device 100 through the sensing unit 150, the playback control program 115 may also select a playback scheme of a video content or a moving picture content, which matches with the shaking of the electronic device 100 from among the playback schemes stored in the data storing unit 112. Here, the playback scheme may include one or more of once playback, repetitive playback, once reverse playback, and repetitive reverse playback.

The playback control program 115 may also select at least one piece of input information for controlling a corresponding video content or moving picture content from among input information pieces whose content playback scheme are matched. In an embodiment, the playback control program 115 may control input information pieces 920 and 1030 whose content playback scheme are matched as shown in FIGS. 9C and 10C to be displayed on the display unit 170. Then, the playback control program 115 selects at least one piece of input information among input information pieces 920 and 1030 whose content playback schemes are matched as input information for playing a video content or a moving picture content. In this case, the playback control program 115 controls the video content or the moving picture content to be played on the basis of at least one piece of information selected from among input information pieces 920 and 1030 whose playback schemes of the video content or moving picture content are matched.

Figure 9D:
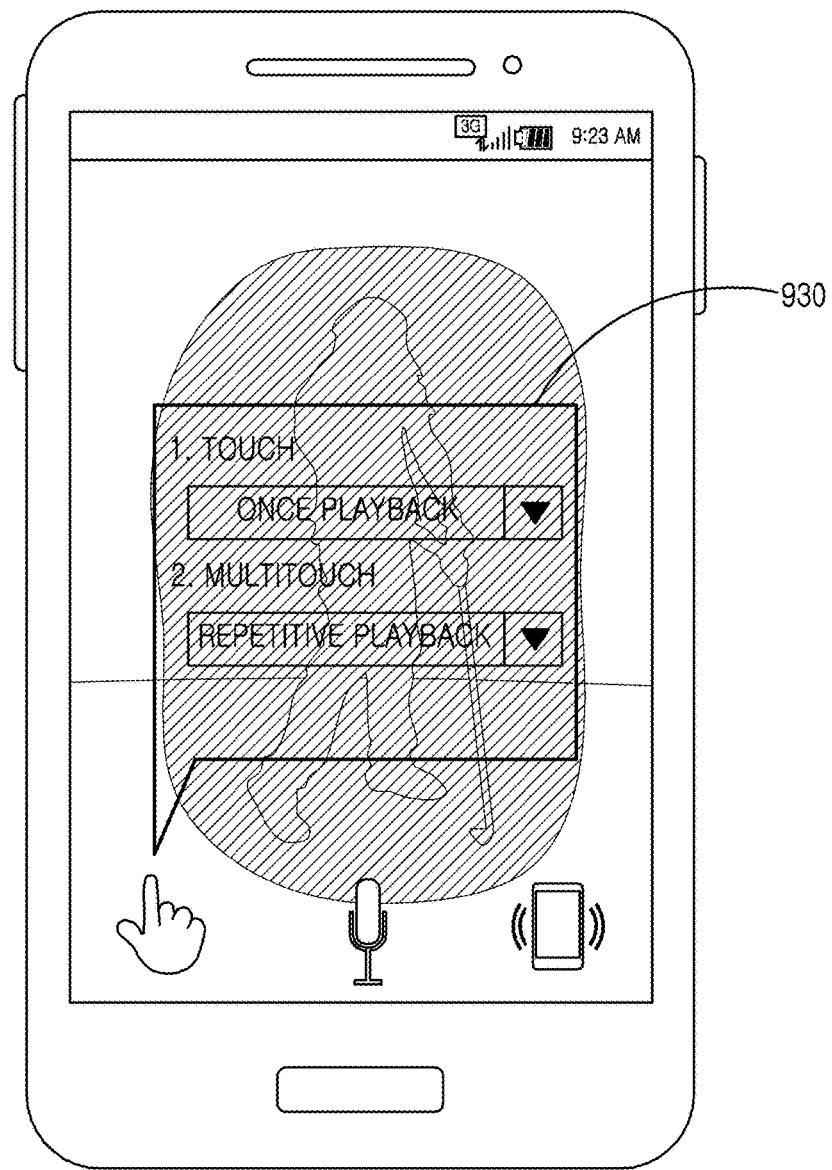
Figure 9E:
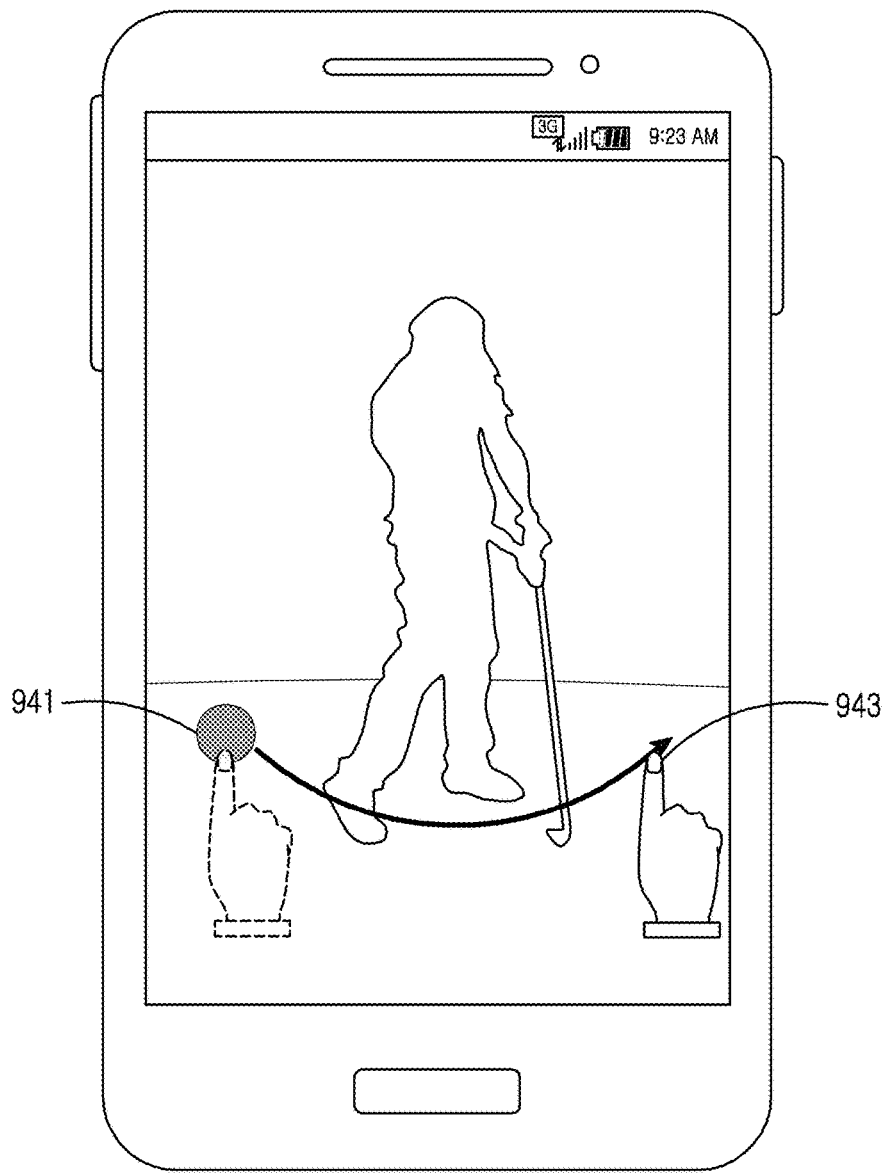

As another embodiment, the playback control program 115 may control input schemes 930 and 1040 whose control playback schemes are matched to be displayed on the display unit 170 as shown in FIGS. 9D and 10D. Then, the playback control program 115 may select at least one input scheme from among input schemes 930 and 1040 whose content playback schemes are matched as an input scheme for playing a video content or a moving picture content. When a touch input scheme is selected as shown in FIG. 9D, the playback control program 115 may control the video content or the moving picture content to be played on the basis of at least one piece of input information 930 according to the touch input scheme among input information pieces whose content playback schemes are matched.

Furthermore, when selecting a voice recognition scheme as shown in FIG. 10D, the playback control program 115 may control the video content or the moving picture content to be played on the basis of at least one piece of input information 1040 according to the voice recognition scheme among input information pieces whose content plying scheme are matched. Here, the input scheme may include at least one of a touch input scheme such as a single touch, a multi-touch, and a drag, a voice recognition scheme, and a gesture input scheme. The playback control program 115 may include at least one software element for selectively playing at least one motion region included in the moving picture content. For example, when voice command "Throw" is sensed among voice recognition information pieces 1040 shown in FIG. 10D, the playback control program 115 controls only a first motion region 1010 to be played once in the moving picture content including two motion regions 1010 and 1020 as shown in FIG. 10B.

As another example, when voice command "play" is sensed among the voice recognition information pieces shown in FIG. 10D, the playback control program 115 may control the moving picture content shown in FIG. 10B to be played once. That is, the playback control program 115 may control the first and second motion regions 1010 and 1020 included in the moving picture content to be played once.

Figure 5:
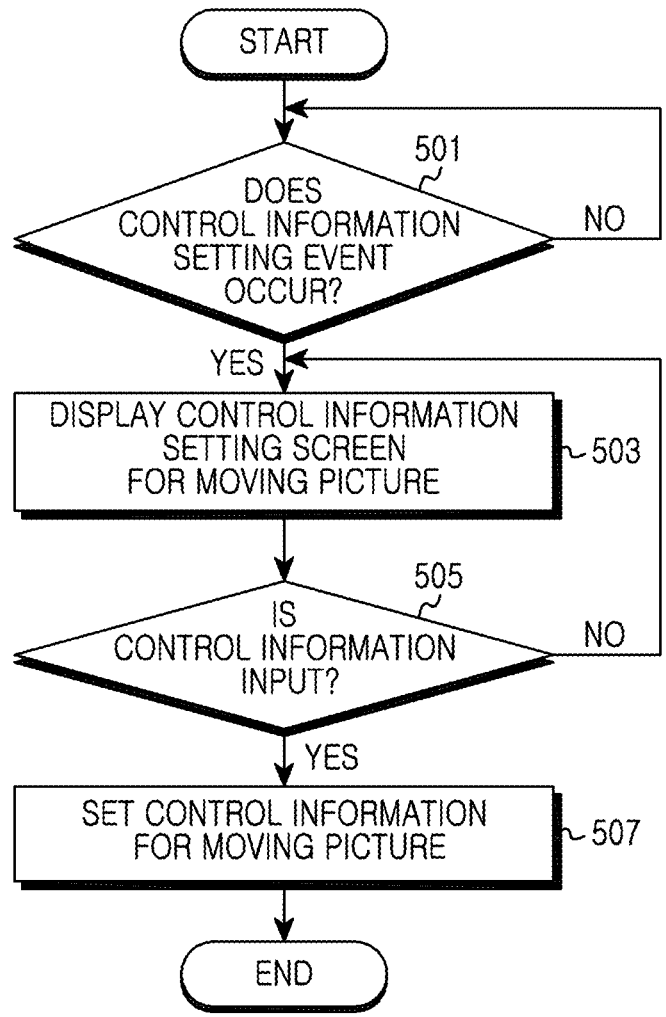
FIG. 5 is a flowchart of a procedure for setting control information on a moving picture content in an electronic device according to an embodiment of the present invention.

The playback control program 115 may include at least one software element for setting a playback scheme which matches with at least one piece of input information in order to control a video content or a moving picture content. For example, the playback control program 115 may set a playback scheme matching with input information for controlling the video content or the moving picture content by using an input information setting menu as shown in FIG. 5. As another example, the playback control program 115 may set a playback scheme matched with the input information for controlling the moving picture content when creating a moving picture through the moving picture creating program 114.

The application program 116 may include a software element for at least one application program installed in the electronic device 100.

The processing unit may include a memory interface 121, at least one processor 122, and a peripheral device interface 123. Here, the memory interface 121 included in the processor unit 120, the at least one processor 122 and the peripheral device interface 123 may be integrated as at least one integrated circuit or implemented as separate elements.

The memory interface 121 may control an access of elements, such as the processor 122 or the peripheral device interface 123, to the memory 110.

The peripheral device interface 123 may control connections of input/output peripheral devices of the electronic device 100 to the processor 122 and memory interface 121.

The processor 122 may perform a control to allow the electronic device 100 to provide various multimedia services by using at least one software program. At this time, the processor 122 may execute at least one program stored in the memory 110 to provide a service corresponding to the program. For example, the processor 122 may execute the moving picture creating program 114 stored in the program storing unit 111 to generate a moving picture content. As another example, the processor 122 may execute a playback control program 115 stored in the program storing unit 111 to determine a playback scheme of a moving picture content on the basis of the user's input information.

The audio processing unit 130 may provide an audio interface between the user and the electronic device 100 through the speaker 131 and microphone 132.

The camera unit 140 provides, to the processor unit 120, collected images obtained through imaging a subject. In detail, the camera unit 140 may include a camera sensor converting an optical signal into an electrical signal, an image processing device converting an analog image signal into a digital image signal, and a signal processing device processing the image signal output from the image processing device and displaying the processed image signal on the display unit 170. Here, the camera unit 140 may include at least one of a first camera disposed on a front surface of the electronic device 100 and a second camera disposed on a rear surface of the electronic device 100.

The camera unit 140 may obtain at least one image through consecutive imaging and provide the obtained image to the processor unit 120. For example, when sensing a shutter button input, the camera unit 140 may obtain at least one image through consecutive imaging by the reference number of times at a reference interval. At this time, when or after sensing the shutter button input, the camera unit 140 may start to consecutively image a subject from a time point when movement of the subject is sensed. For another example, the camera unit 140 may perform consecutive imaging at a reference interval to obtain at least one image, while the shutter button input is maintained. At this time, the camera unit 140 may start to consecutively image a subject from a time point when movement of the subject is sensed, when or after a shutter button input is sensed. For another example, the camera unit 140 may obtain at least one image by adjusting an s frame interval for imaging a video, when imaging the video.

The sensing unit 150 may sense movement of the electronic device 100. For example, the sensing unit 150 may include one or more of an accelerometer, a gravity sensor, and a geomagnetic sensor.

The input and output control unit 160 may provide an interface between an input and output device, such as the display unit 170 and the input unit 180, and the peripheral device interface 123.

The display unit 170 may display state information on the electronic device 100, characters input by a user, a video and a still image. For example, the display unit 170 may display information on an application program driven by the processor 122.

The input unit 180 may provide input data created by a user's selection to the processor unit 120 through the input and output control unit 160. At this time, the input device 180 may include one or more of a keypad including at least one hardware button and a touch pad sensing touch information. For example, the input unit 180 may provide the touch information sensed through the touch pad to the processor 122 through the input and output control unit 160.

Additionally, the electronic device 100 may include a communication system performing a communication function for voice communication and data communication. At this time, the communication system may be divided into a plurality of communication sub-modules supporting different communication networks. For example, the communication network includes, but is not limited to, a global system for mobile communications (GSM) network, an enhanced data for global evolution (EDGE) network, a code-division multiple access (CDMA) network, a wideband-CDMA (W-CDMA) network, a long term evolution (LTE) network, an orthogonal frequency-division multiple access (OFDMA) network, a wireless LAN, or/and a bluetooth network.

In the above described embodiment, the processor 122 may execute software elements stored in the memory 110 in a single module to create a moving picture content and determine a playback scheme of the moving picture content according to user's input information.

In another embodiment, the processor 122 may configure elements as separate modules where the elements are used for creating the moving picture content and determining the playback scheme of the moving picture content according to the user's input information.

Figure 2:
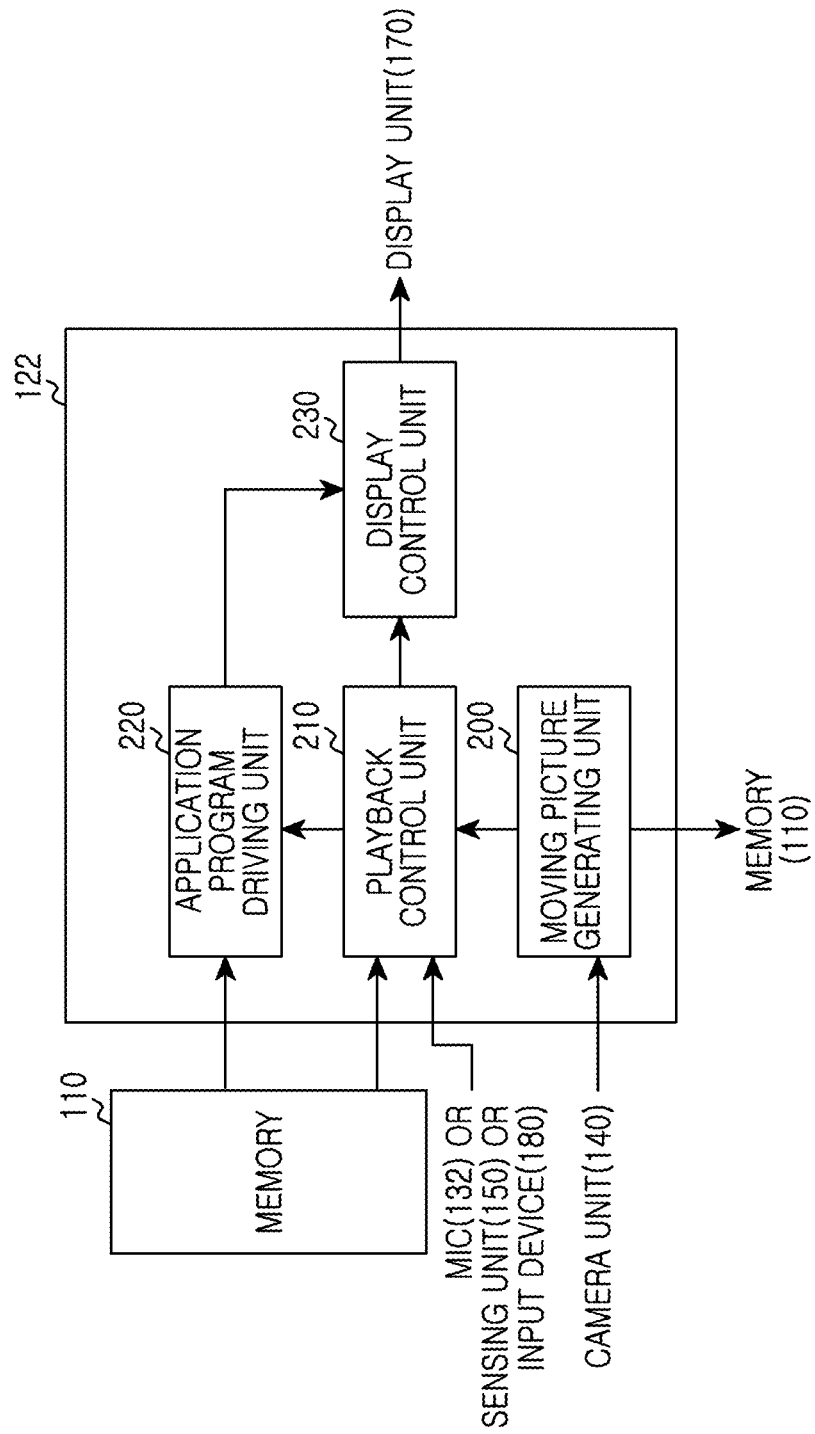
FIG. 2 illustrates a detailed block configuration of a processor according to an embodiment of the present disclosure.

FIG. 2 illustrates a detailed block configuration of a processor according to an embodiment of the present disclosure.

Referring to FIG. 2, the processor 122 may include a moving picture creating unit 200, a playback control unit 210, an application program driving unit 220, and a display control unit 230.

The moving picture creating unit 200 may execute the moving picture creating program 114 stored in the program storing unit 111 to create a moving picture content. For example, the moving picture creating unit 200 may synthesize a plurality of images consecutively imaged through the camera unit 140 to create the moving image content.

As another example, the moving picture creating unit 200 may synthesize information pieces on motion regions set by the user's input information provided from the input device 180 among a plurality of images consecutively imaged through the camera unit 140 and create the moving picture content.

As a further example, the moving picture creating unit 200 compares a plurality of images consecutively imaged through the camera unit 140 and extracts regions where movements occur to set the extracted regions as the motion regions. Then, the moving picture creating unit 200 may also create a moving picture content by synthesizing information pieces on motion regions of consecutively imaged images.

At this time, the moving picture creating unit 200 may compare the images by a pixel unit to set the motion regions.

The playback control unit 210 may execute the playback control program 115 stored in the program storing unit 111 to determine a playback scheme for a video content or a moving picture content according to user's input information received through at least one of the microphone 132, a sensing unit 150 and the input device 180. For example, as shown in FIG. 9E, when sensing a touch input in a dragging motion between point 941 and point 943 on the input device 180, the playback control unit 210 may select a playback scheme of a video or a moving picture content, which matches with the drag information, from among playback schemes stored in the data storing unit 112.

In another example, as shown in FIG. 10E, when receiving a voice command 1050 "Throw" through the microphone 132, the playback control unit 210 may select a playback scheme of a video content or a moving picture content, which matches with the voice command "Throw" 1050, from among playback schemes stored in the data storing unit 112.

The playback control unit 210 may select at least one piece of information for controlling a corresponding video content or moving picture content from among input information pieces whose content playback schemes are matched. For example, the playback control unit 210, as shown in FIGS. 9C and 10C, may control input information pieces 920 and 1030 whose content playback schemes are matched to be displayed on the display unit 170. Then, the playback control unit 210 may select at least one piece of input information among input information pieces 920 and 1030 whose content playback schemes may be matched as the input information for playing the video content or the moving picture content. In this case, the playback control unit 210 performs a control to play a moving content or a moving picture content on the basis of at least one piece of input information selected from among input information pieces 920 and 1030 whose content playback schemes of the video content or the moving picture content are matched.

As another example, as shown in FIGS. 9D and 10D, the playback control unit 210 may control the input schemes 930 and 1040 whose content playback schemes are matched to be displayed on the display unit 170. Then, the playback control unit 210 may select at least one input scheme among input schemes 930 and 1040 whose content playback schemes are matched as an input scheme for playing a video content or a moving picture content. When the touch input scheme is selected as shown in FIG. 9D, the playback control unit 210 may perform a control to playing of the video content or the moving picture content on the basis of at least one piece of input information 930 according to a touch input scheme among input information pieces whose content playback schemes are matched. Moreover, when a voice recognition scheme is selected as shown in FIG. 10D, the playback control unit may perform a control to play the video content or the moving picture content on the basis of at least one piece of input information 1040 according to a voice recognition scheme among input information pieces whose content playback scheme are matched.

The playback control unit 210 may selectively play at least one motion region included in a moving picture content. For example, when sensing a voice recognition command "Throw" 1050 among voice recognition information pieces 1040 as shown in FIG. 10D, the playback control unit 210 performs a control to play once only a first motion region 1010 in the moving picture content including two motion regions 1010 and 1020 in FIG. 10B. As another example, when sensing voice recognition command "play" among the voice recognition information pieces 1040 as shown in FIG. 10D, the playback control unit 210 performs a control to play once a moving picture content shown in FIG. 10B. That is, the playback control unit 210 performs a control to play once the first and second motion regions 1010 and 1020 included in the moving picture content.

The playback control unit 210 may set a playback scheme for matching with at least one piece of input information for controlling a video content or a moving picture content. For example, the playback control unit 210 may determine a playback scheme for matching a video content or a moving picture content with input formation for a control by using an input information setting menu as shown in FIG. 5. For another example, the playback control unit 210 may determine a playback scheme for matching a moving picture content with input information for a control when the moving picture is created through the moving picture creating program 114.

The application program driving unit 220 may execute at least one application program 116 stored in the program storing unit 111 to provide a service according to a corresponding application program. For example, the application program driving unit 220 may execute an application program stored in the program storing unit 111 to play the moving picture content. At this time, the application program driving unit 220 may play the moving picture content according to a playback scheme determined in the playback control unit 210.

The display control unit 230 may perform a control to execute the GUI program 113 stored in the program storing unit 111 to graphically display a user interface on the display unit 170. For example, the play control unit 230 may perform a control to display information on an application program driven in the application program driving unit 220 on the display unit 170.

As described above, the playback control unit 210 may perform a control to only play some of motion regions among motion regions included in the moving picture content. For example, the playback control unit 210 may perform a control to play only the first region 1010 in the moving picture content including the two motion regions 1010 and 1020 shown in FIG. 10B. In this case, the display control unit 220 may display only the first motion region 1010 as being played by superimposing a reference image of the moving picture content with the moving picture content which is being played.

In the above described embodiment, the electronic device 100 may create a moving picture content and determine a content playback scheme corresponding to user's input information by using the processor 122 including the moving picture creating unit 200 and the playback control unit 210.

In another embodiment, the electronic device 100 may include a separate control module for creating a moving picture content and determining a content playback scheme corresponding to user's input information.

Figure 3:
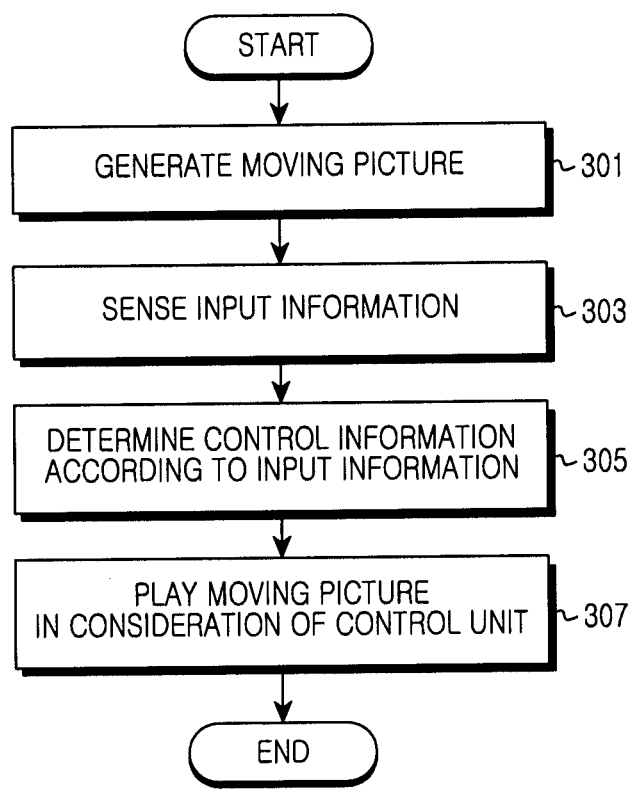
FIG. 3 is a flowchart of a procedure for playing a moving picture content in an electronic device according to an embodiment of the present disclosure.

FIG. 3 is a flowchart of a procedure for playing a moving picture content in an electronic device according to an embodiment of the present disclosure.

Referring to FIG. 3, the electronic device may generate or create a moving picture content in operation 301. For example, the electronic device may synthesize a plurality of consecutively imaged images to create a moving picture content. At this time, the electronic device may synthesize motion regions of the consecutively imaged images to create the moving picture content.

When the moving picture content is created, the electronic device may proceed to operation 303 and sense input information through at least one of the microphone 132, the sensing unit 150, and the input device 180.

Then, the electronic device proceeds to operation 305 and determines control information on a content matched with the input information sensed in operation 303. Here, the control information may include a playback scheme for the moving picture content.

When confirming the control information for the content, the electronic device may proceed to operation 307 and play the moving picture content on the basis of the control information on the content matched with the input information. For example, as shown in FIG. 9E, when sensing a touch input as a dragging motion between point 941 and point 943 on the input device 180, the electronic device may play once the moving picture content according to the playback scheme of the moving picture content, which matches with the drag information. At this time, the electronic device may control a playing point of "golf swing" included in the motion region 910 according to a drag distance. For another example, as shown in FIG. 10E, when receiving voice recognition command "Throw" 1050 from the microphone 132, the electronic device may play once only the second motion region 1020 of the moving picture content according to the playback scheme matched with the voice recognition command "Throw" 1050.

In the above described embodiment, the electronic device may play the moving picture content according to control information on the moving picture content matched with the input information.

In another embodiment, the electronic device may play at least one content selected for playing from among video contents and moving picture contents stored n the data storing unit 112 according to control information which matches with the input information.

Figure 4:
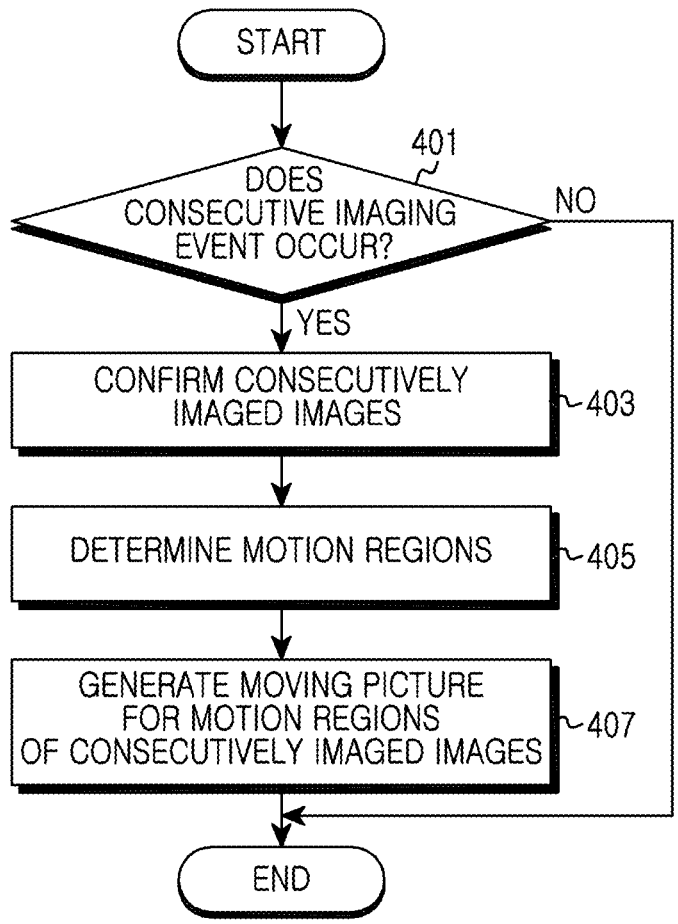
FIG. 4 is a flowchart of a procedure for generating a moving picture content in an electronic device according to an embodiment of the present disclosure.

FIG. 4 is a flowchart of a procedure for creating a moving picture content in an electronic device according to an embodiment of the present disclosure.

Referring to FIG. 4, the electronic device may confirm whether a consecutive imaging event occurs in operation 401. For example, the electronic device may confirm whether a shutter button input is sensed for the camera unit 140 that is set as a consecutive imaging mode. As another example, the electronic device may confirm whether the shutter button input is maintained for a predetermined time in the camera unit 140.

When the consecutive imaging event occurs, the electronic device may proceed to operation 403 and may confirm at least one image consecutively imaged. For example, when sensing the shutter button input, the electronic device may obtain a plurality of images 900 and 1000 as shown in FIG. 9A or 10B through consecutive imaging the reference number times at a reference interval. At this time, the electronic device may start consecutive imaging from a time point when movement of a subject is sensed when or after the shutter button input is sensed. As another example, the electronic device may perform consecutive imaging at the reference interval while the shutter button input is maintained, and may obtain a plurality of images 900 and 1000 as shown in FIG. 9A or 10A. At this time, the electronic device may start to perform consecutive imaging from a time point when movement of the subject is sensed, when or after the shutter button input is sensed. For another example, the electronic device may adjust a frame interval for imaging a video to obtain a plurality of images.

After confirming consecutively imaged images, the electronic device may proceed to operation 405 and may determine motion regions for the consecutively imaged images. At this time, the electronic device may determine one motion region 910 as shown in FIG. 9B, or a plurality of motion regions 1010 and 1020 as shown in FIG. 10B. For example, the electronic device may set any reference image among the consecutively imaged images to display the set reference image on the display unit 170. Then, the electronic device may set a motion region on the basis of touch information on the reference image. As another example, the electronic device may compare consecutively imaged images to set a region where movement is sensed as a motion region. Here, the electronic device may compare the images by a pixel unit to set a motion region.

After determining the motion region, the electronic device proceeds to operation 407 to synthesize the motion regions of the consecutively imaged images and generate a moving picture content.

As described above, the electronic device may synthesize motion regions of the consecutively imaged images to generate the moving picture content. At this time, the electronic device may set input information and a playback scheme for playing the moving picture content. For example, after generating the moving picture content, the electronic device may set the input information and playback scheme for playing the moving picture content by using a control information setting menu as shown in FIG. 5. At this time, the electronic device may set, identically with a case shown in FIG. 5, the input information and playback scheme for playing a video content or a moving picture content stored in the data storing unit 112 by control information setting menu selection regardless of the moving picture content generation.

FIG. 5 is a flowchart of a procedure for setting control information on a moving picture content in an electronic device according to an embodiment of the present invention.

Referring to FIG. 5, the electronic device may confirm whether a control information setting event occurs in operation 501. For example, the electronic device may confirm whether the control information setting menu is selected. As another example, it may be confirmed whether a control information setting icon is selected. As another example, the electronic device may confirm whether a moving picture content for setting control information is generated.

Figure 11:
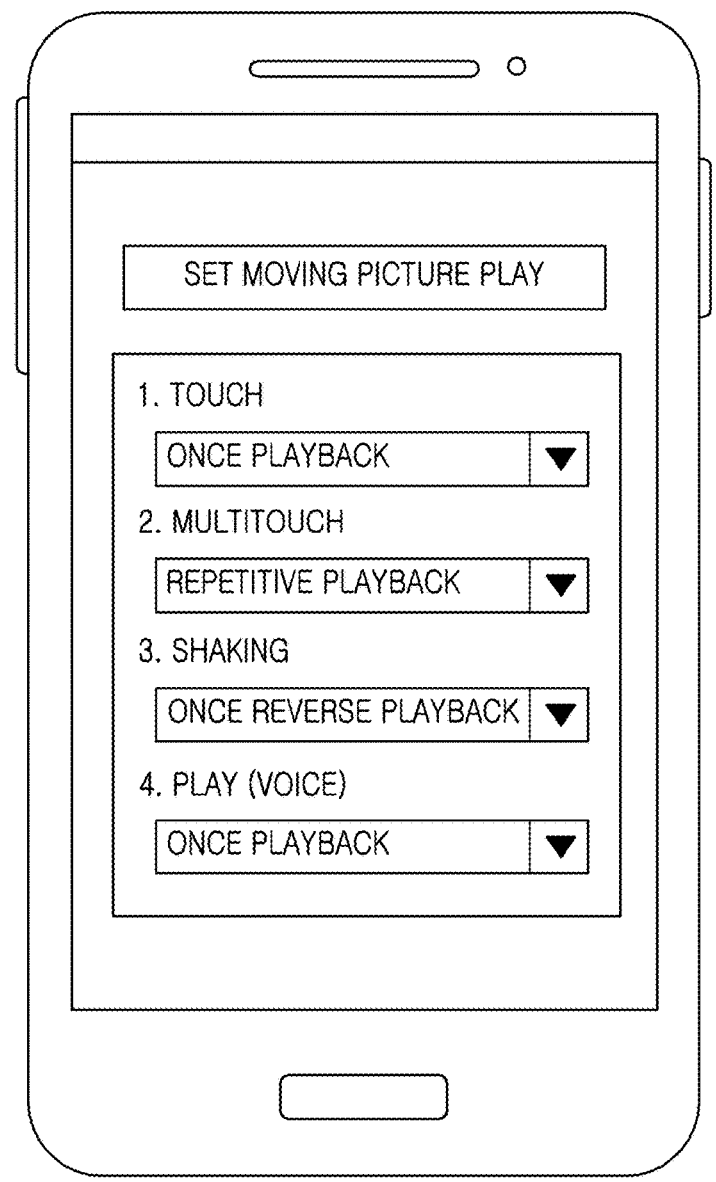
FIG. 11 illustrates a screen configuration for setting control information on a moving picture content in an electronic device according to an embodiment of the present invention.

When the control information setting event occurs, the electronic device may proceed to operation 503 and display, on the display unit 170, a control information setting screen for setting control information on the moving picture content. For example, the electronic device may display, on the display unit 170, the control information setting screen configured as shown in FIG. 11. As another example, the electronic device may display a pop-up window for setting control information so as to be superimposed with the moving picture content displayed on the display unit 170.

Then, the electronic device may proceed to operation 505 and confirm whether the control information setting is completed. For example, the electronic device may display input information input by a user through the input device 180 and a playback scheme for playing the moving picture content on a control information setting screen. Then, the electronic device confirms whether an input completion menu is selected.

When the control information setting is completed, the electronic device may proceed to operation 507 and store the input information and playback scheme information for playing the moving picture content set through the control information setting screen in the data storing unit 112.

In the above described embodiment, after generating the moving picture content, the electronic device may set the input information and playback scheme for playing the moving picture content by using the control information setting menu.

In another embodiment, the electronic device may select the input information and playback scheme to playback the generated moving picture content from among preset input information and playback information pieces for playing the moving picture content. For example, after generating the moving picture content, the electronic device may display, on the display unit 170, preset input information and playback information pieces 920 and 1030 for playing the moving picture content as shown in FIG. 9C or 10C. Then, the electronic device may select matching information on the input information and playback scheme for application to playback of the moving picture content among the preset input information and playback scheme information pieces 920 and 1030 for playing the moving picture content, which are displayed on the display unit 170. As another example, after generating the moving picture content, the electronic device may display, on the display unit, playback scheme information pieces 930 and 1040 according to a preset input scheme for playing the moving picture content as shown in FIG. 9D or 10D. Then, the electronic device may select matching information on the playback scheme according to the input scheme for application to playback of the moving picture content among the preset playback scheme information pieces 920 and 1030 according to the input scheme for playing the moving picture content displayed on the display unit 170.

Figure 6:
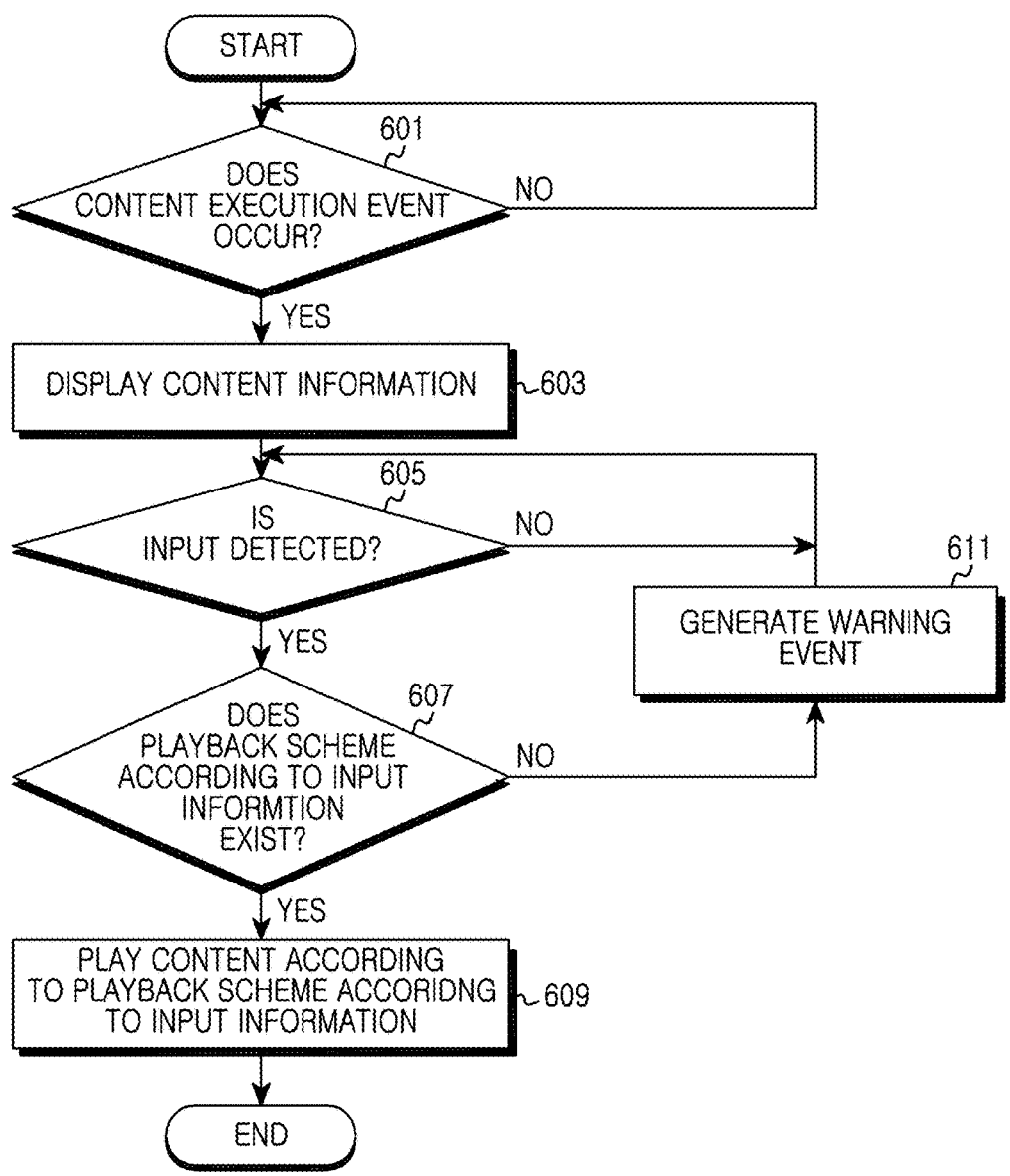
FIG. 6 is a flowchart of a procedure for playing a content on the basis of input information in an electronic device according to an embodiment of the present invention.

FIG. 6 is a flowchart of a procedure for playing contents on the basis of input information in an electronic device according to an embodiment of the present invention.

Referring to FIG. 6, the electronic device may confirm whether a content executing event occurs in operation 601. For example, the electronic device confirms whether a moving picture content for execution is selected from among at least one moving picture content stored in the data storing unit 112. For another example, the electronic device may confirm whether a video content for execution is selected from among at least one video content stored in the data storing unit 112.

When the content executing event occurs, the electronic device proceeds to operation 603 and displays information on the content selected for execution on the display unit 170. For example, the electronic device may display a reference screen of the moving picture content on the display unit 170. At this time, the electronic device maintains the moving picture content as a standby state. For another example, the electronic device may display a reference screen of the video on the display unit 170. Here, the reference screen of the video may include a thumbnail of the video or an image at a playback start time of the video.

Then, the electronic device may proceed to operation 605 and confirms whether input information is sensed through at least one of the microphone 132, the sensing unit 150 and the input device 180.

When sensing the input information, the electronic device may proceed to operation 607 and confirms whether control information on a content matched with the sensed input information exists. Here, the control information may include a playback scheme for the content.

When the control information on the content matched with the input information does not exist, the electronic device may proceed to operation 611 and generates a warning event. For example, the electronic device generates at least one of a warning message and a warning sound representing that the control information on the content matched with the input information does not exist.

Then, the electronic device may proceed to operation 605 and may confirm again whether the input information is sensed.

Moreover, when the control information on the content matched with the input information exists, the electronic device may proceed to operation 609 and play a video content or a moving picture content on the basis of the control information on the content matched with the input information. For example, when sensing a touch input is inputted as a dragging motion between point 941 and point 943 through the input device 180, as shown in FIG. 9E, the electronic device plays once the moving picture content according to a playback scheme matched with the drag information. At this time, the electronic device may control a playback point of gold swing according to a drag distance. As another example, when receiving a voice command "Throw" 1050 through the microphone 132 as shown in FIG. 10E, the electronic device may play once only the second motion region 1020 of the moving picture content according to a playback scheme matched with the voice command "Throw" 1050.

Figure 7:
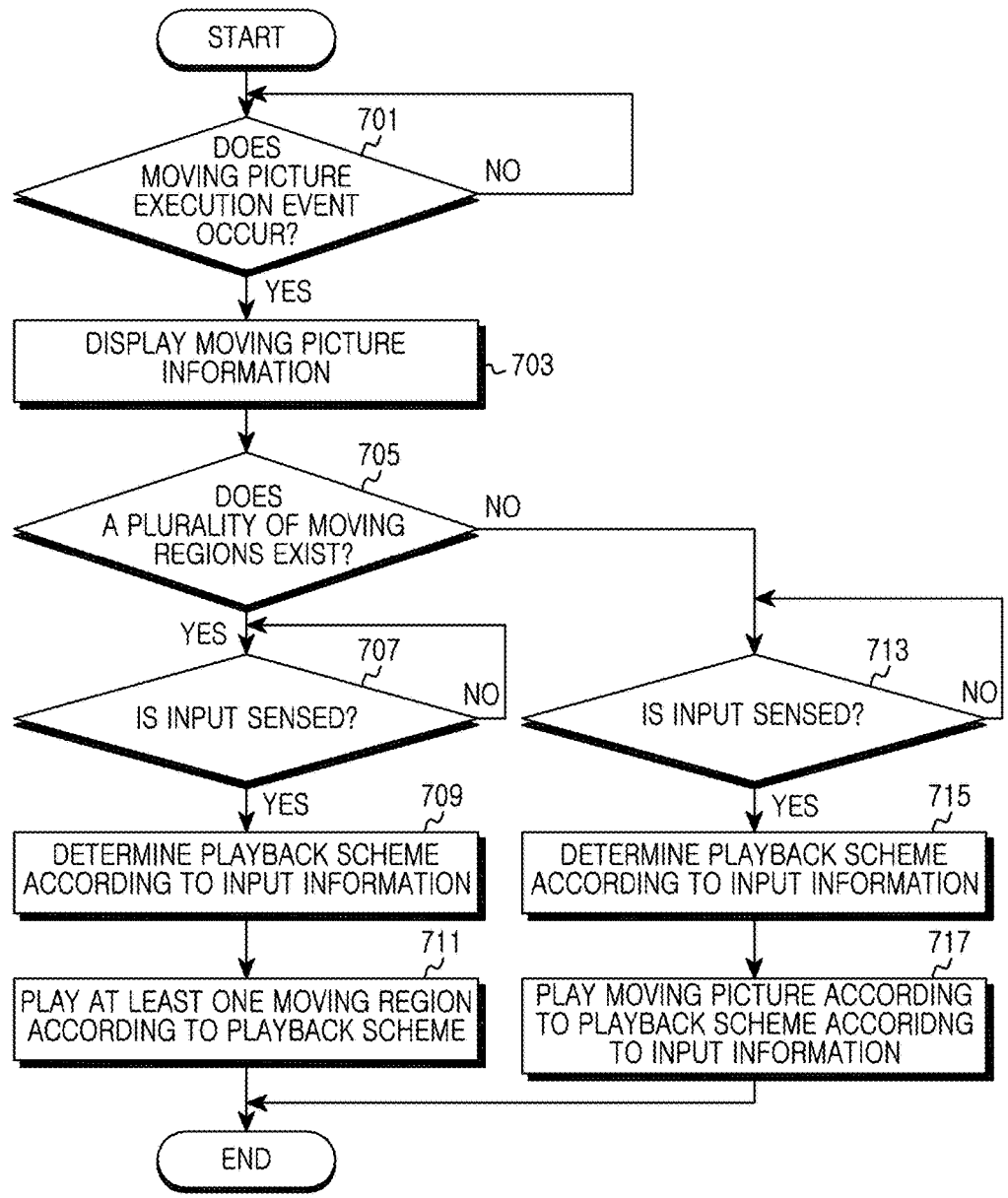
FIG. 7 is a flowchart of a procedure for playing a moving picture content on the basis of input information in an electronic device according to another embodiment of the present invention.

FIG. 7 is a flowchart of a procedure for playing a moving picture content on the basis of input information in an electronic device according to another embodiment of the present invention.

Referring to FIG. 7, the electronic device confirms whether an execution event for the moving picture content occurs in operation 701 in the electronic device. For example, the electronic device confirms whether a moving picture content for execution is selected from among at least one moving picture content stored in the data storing unit 112.

When the execution event for the moving picture content occurs, the electronic device may proceed to operation 703 and display information on the selected moving picture content on the display unit 170. For example, the electronic device may display a reference screen of the moving picture content on the display unit 170. At this time, the electronic device may maintain the moving picture content as a standby state.

Then, the electronic device may proceed to operation 705 and confirm whether a motion region included in the moving picture content is plural.

When the moving picture content includes a plurality of motion regions, the electronic device may proceed to operation 707 and confirm whether input information is sensed through at least one of the microphone 132, the sensing unit 150, and the input device 180.

When sensing the input information, the electronic device may proceed to operation 709 and confirm the control information on the moving picture content matched with the input information sensed in operation 707. When the control information on the moving picture content matched with the input information does not exist, the electronic device may generate at least one of a warning message and a warning sound that the control information on the moving picture content matched with the input information does not exist.

When confirming the control information on the moving picture content matched with the input information, the electronic device proceeds to operation 711 and plays at least one motion region included in the moving picture content on the basis of the control information matched with the input information. For example, when receiving the voice command "Throw" 1050 through the microphone 132 as shown in FIG. 10E, the electronic device may play once only the second motion region 1020 of the moving picture content according to a playback scheme matched with the voice command "Throw" 1050. As another example, when sensing a drag for the first motion region 1010 in the moving picture content as shown in FIG. 10B, the electronic device plays once only the first motion region 1010 of the moving picture content according to a playback scheme matched with the drag information. As another example, when receiving voice command "Play" through the microphone 132, the electronic device may play once the first and second motion regions 1010 and 1020 of the moving picture content according to a playback scheme matched with the voice command "Play".

When a moving picture content includes one motion region, the electronic device may proceed to operation 713 and confirm whether input information is sensed through at least one of the microphone 132, the sensing unit 150, and the input device 180.

When sensing the input information, the electronic device may proceeds to operation 715 and confirms control information on the moving picture content matched with the input information sensed in operation 713. When the control information on the moving picture content matched with the input information does not exist, the electronic device may generate at least one of a warning message and a warning sound indicating that the control information on the moving picture content matched with the input information does not exist.

When confirming the control information on the moving picture content matched with the input information, the electronic device proceeds to operation 717 and plays the moving picture content on the basis of the control information on the moving picture content, which is matched with the input information. For example, when sensing a drag 941 and 943 through the input device 180, as shown in FIG. 9E, the electronic device plays once the motion region of the moving picture content according to a playback scheme matched with the drag information.

Figure 8:
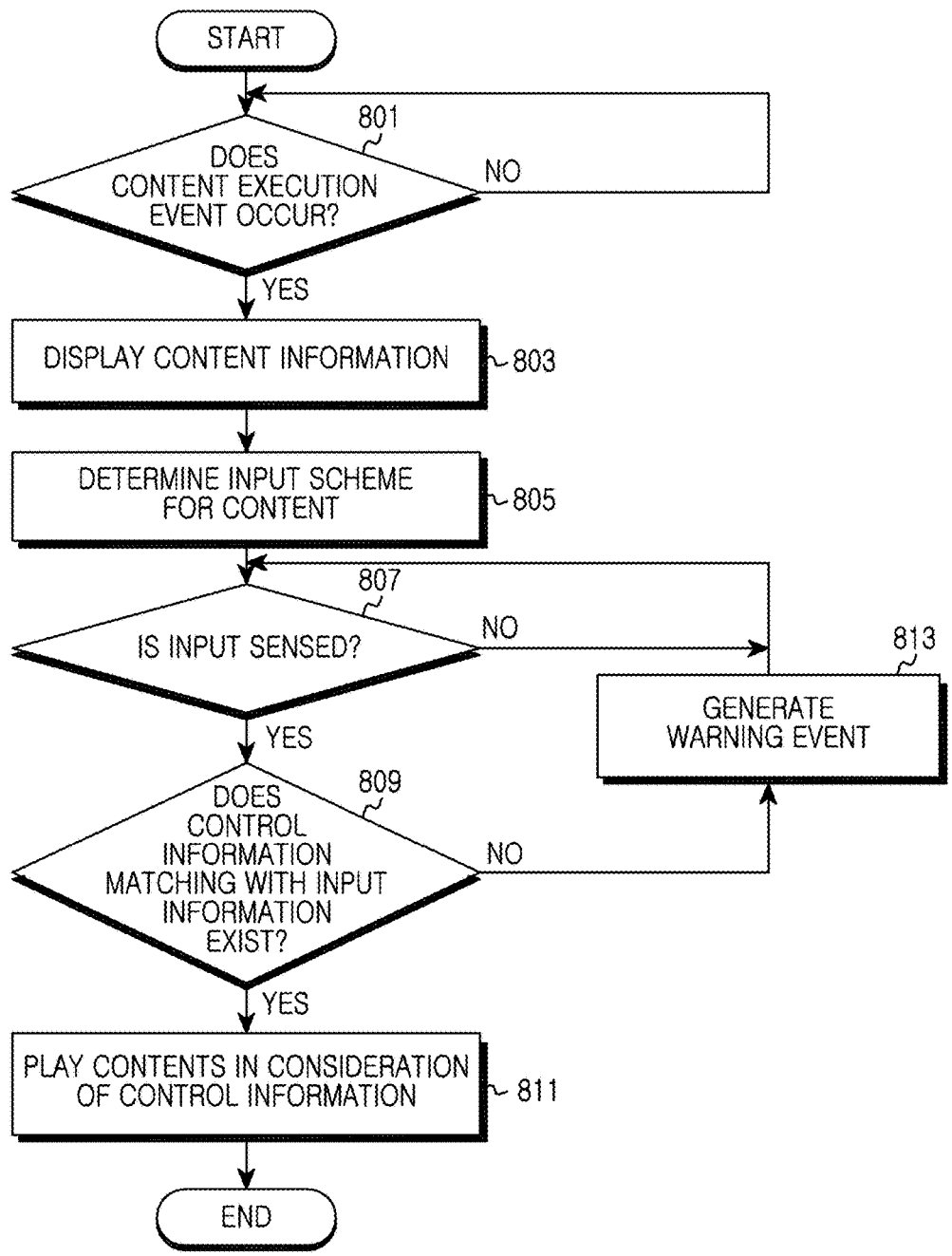
FIG. 8 is a flowchart of a procedure for playing a moving picture content on the basis of input information in an electronic device according to another embodiment of the present invention.

FIG. 8 is a flowchart of a procedure for playing a content on the basis of input information in an electronic device according to another embodiment of the present invention.

Referring to FIG. 8, the electronic device may confirm whether a content execution event occurs in operation 801. For example, the electronic device confirms whether a moving picture content for execution is selected from among at least one moving picture content stored in the data storing unit 112. As another example, the electronic device confirms whether a video content for execution is selected from among at least one video content stored in the data storing unit 112.

When the content execution event occurs, the electronic device proceeds to operation 803 and displays information on the selected content for execution on the display unit 170. At this time, the electronic device maintains the moving picture content as a standby state. For another example, the electronic device may display a reference screen of a video on the display unit 170. Here, the reference screen of the video may include a thumbnail of the video or an image at a playback start time of the video.

Then, the electronic device may proceed to operation 805 and determines input information for playing the content. For example, the electronic device displays, on the display unit 170, input information 920, 930, 1030, or 1040 matched with a playback scheme of the content, as shown in FIG. 9C, 9D, 10C, or 10D. Then, the electronic device may select, as input information for playing, at least one piece of input information from among the input information pieces 920 and 1030 matched with the playback scheme of the content.

After determining the input information for playing the content, the electronic device may proceed to operation 807 and confirm whether input information is sensed through at least one of the microphone 132, the sensing unit 150 and the input device 180.

When sensing the input information, the electronic device proceeds to operation 809 and confirms whether control information on the content exists, which matches with the input information sensed in operation 807. Here, the control information may include a playback scheme on the content.

When the control information on the content matched with the input information does not exist, the electronic device may proceed to operation 813 and generate a warning event. For example, the electronic device may generate at least one of a warning message and a warning sound indicating that the control information on the moving picture content matched with the input information does not exist.

Then, the electronic device may proceed to operation 807 and confirm again whether the input information is sensed.

Furthermore, when the control information on the content matched with the input information exists, the electronic device may proceed to operation 811 and play a video content or a moving picture content on the basis of the control information on the content matched with the input information. For example, when sensing a touch input as a dragging motion between point 941 and point 943 on the input device 180, as shown in FIG. 9E, the electronic device plays once the moving picture content according to a playback scheme matched with the drag information. At this time, the electronic device may control a play time of gold swing according to a drag distance. For another example, when receiving voice command "Throw" 1050 through the microphone 132, as shown in 10E, the electronic device may play once only the second motion region 1020 of the moving picture content according to the playback scheme matched with the voice command "Throw".

In the above described embodiment, the electronic device may play a video content or a moving picture content according to a playback scheme matched with user' input information, which is received through at least one of the microphone 132, the sensing unit 150 and the input device 180. At this time, the electronic device may enlarge or contract the motion region of the moving picture content according to the user' input information.

As described above, by playing a video content or a moving picture content according to a playback scheme matched with the user's input information in an electronic device, user's interest can be induced in the video content or the moving picture content.

Also, by recognizing a motion of a subject and automatically setting a motion region for generating a moving picture content in an electronic device, the moving picture content can be easily generated.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

In addition, an artisan understands and appreciates that a "processor" or "microprocessor" constitute hardware in the claimed invention. Under the broadest reasonable interpretation, the appended claims constitute statutory subject matter in compliance with 35 U.S.C. §101.

While the disclosure has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present disclosure.

What is claimed is:

1. A method for performing an operation in an electronic device, the method comprising:
   comparing a plurality of consecutively recorded images to determine regions in the plurality of images where motion is occurring;
   synthesizing the regions in the plurality of images to create content, the content capable of being played to illustrate motion;
   setting at least two playback schemes for the content such that each playback scheme is activated in response to different types of input;
   in response to detecting an input, determining a playback scheme corresponding to a type of the detected input; and
   playing back the content according to the playback scheme corresponding to the type of the detected input.

2. The method of claim 1, wherein the different types of the input comprise one or more of a voice input, a gesture input, and a touch input, a multi-touch input, and a drag input.

3. The method of claim 1, wherein the at least two playback schemes comprise once forward playback, repetitive forward playback, once reverse playback, and repetitive reverse playback, each playback scheme corresponding to a different type of the detected input.

4. The method of claim 1, wherein the determining of the playback scheme comprises:
   if the type of the detected input is unknown, generating at least one of a warning message and a warning sound.

5. The method of claim 1, wherein the content comprises one or more of a video content and a moving picture content.

6. The method of claim 1, further comprising displaying a reference image, wherein the reference image comprises any one of a thumbnail of a video content, an image at a playback start time of the video content, and a basic image of a moving picture content.

7. The method of claim 6, further comprising generating a moving picture content before the displaying of the reference image.

8. The method of claim 7, wherein the generating of the moving picture content comprises:
   obtaining the plurality of images through consecutive imaging using a camera;
   determining reference regions in the plurality of images; and
   synthesizing images included in the reference regions of the plurality of images to generate the moving picture content.

9. The method of claim 8, wherein the determining of the reference regions comprises:
   comparing the images to extract regions where movement of a subject is sensed; and
   determining the extracted regions as the reference regions.

10. The method of claim 1, wherein the playing the content comprises:
    if the content is included a plurality of reference images, playing one or more reference images based on the determined playback scheme.

11. The method of claim 1, wherein a first playback scheme corresponds to a touch input type, and a second playback scheme corresponds to a voice input type, the method further comprising:
    in response to determining the detected input is of the touch input type, playing back the content according to the first playback scheme, and in response to determining the detected input is of the voice input type, playing back the content according to the second playback scheme.

12. An electronic device comprising:
    a display unit;
    an input unit; and
    at least one processor coupled to a memory and configured to:
      compare a plurality of consecutively recorded images to determine regions in the plurality of images where motion is occurring,
      synthesize the regions in the plurality of images to create content, the content capable of being played to illustrate motion,
      set at least two playback schemes for the content such that each playback scheme is activated in response to different types of input,
      in response to detecting an input by the input unit, determine a playback scheme corresponding to a type of the detected input, and
      play back the content to according to the playback scheme.

13. The electronic device of claim 12, wherein the different types of the input comprise one or more of a voice input, a gesture input, and a touch input, a multi-touch input, and a drag input.

14. The electronic device of claim 12, wherein the at least two playback schemes comprise once forward playback, repetitive forward playback, once reverse playback, and repetitive reverse playback, each playback scheme corresponding to a different type of the detected input.

15. The electronic device of claim 12, wherein the processor is further configured to:
    if the type of the detected input is unknown, generate at least one of a warning message and a warning sound that a playback scheme corresponding to the type of the detected input does not exist.

16. The electronic device of claim 12, wherein the content comprises one or more of a video content and a moving picture content.

17. The electronic device of claim 12, wherein the display unit is configured to display any one reference image of a thumbnail of a video content, an image at a playback start time of the video content, and a basic image of a moving picture content.

18. The electronic device of claim 12, further comprising a camera, wherein the processor is configured to generate a moving picture content using the plurality of images, the plurality of images imaged through the camera.

19. The electronic device of claim 18, wherein the processor is configured to determine the regions in the plurality of images obtained through consecutive imaging using the camera, and to synthesize images included in the regions of the plurality of images to generate the moving picture content.

20. The electronic device of claim 19, wherein the processor is configured to compare the plurality of images to extract regions where movement of a subject is sensed and determine the extracted regions as the regions.

21. The electronic device of claim 12, wherein the processor is configured to play one or more reference images based on the determined playback scheme.

22. The electronic device of claim 12, wherein a first playback scheme corresponds to a touch input type, and a second playback scheme corresponds to a voice input type, the at least one processor further configured to:
    in response to determining the detected input is of the touch input type, play back the content according to the first playback scheme, and in response to determining the detected input is of the voice input type, play back the content according to the second playback scheme.

* * * * *